US005278543A

United States Patent [19]

Orth et al.

[11] Patent Number: 5,278,543

[45] Date of Patent: Jan. 11, 1994

[54] TRANSMITTER WITH MAGNETIC ZERO/SPAN ACTUATOR

[75] Inventors: Kelly M. Orth, Apple Valley; David W. Lee, Farmington; Roger L. Frick, Chanhassen, all of Minn.

[73] Assignee: Rosemount Inc., Eden Prairie, Minn.

[21] Appl. No.: 629,090

[22] Filed: Dec. 17, 1990

Related U.S. Application Data

[63] Continuation of Ser. No. 414,723, Sep. 29, 1989, abandoned, which is a continuation of Ser. No. 112,410, Oct. 22, 1987, abandoned.

[51] Int. Cl.[5] .......... H04Q 1/00

[52] U.S. Cl. .......... 340/825; 340/870.160

[58] Field of Search .......... 335/205-207; 73/718, 724, 753; 364/188, 191, 900; 340/825, 870.16, 870.35, 870.37

[56] References Cited

U.S. PATENT DOCUMENTS

| | | | |
|---|---|---|---|
| 3,046,475 | 7/1962 | Binford | 340/870.16 X |
| 4,101,857 | 7/1978 | O'Toole | 335/206 |
| 4,122,719 | 10/1978 | Carlson et al. | 73/342 |
| 4,126,841 | 11/1978 | Maeno | 335/205 X |
| 4,130,745 | 12/1978 | Hetzer | 335/205 X |
| 4,549,180 | 10/1985 | Masuda | 340/870.39 X |
| 4,739,135 | 4/1988 | Custer | 335/205 X |
| 4,748,852 | 6/1988 | Frick | 73/724 |
| 4,794,372 | 12/1988 | Kazahaya | 340/870.16 |

FOREIGN PATENT DOCUMENTS

| | | | |
|---|---|---|---|
| 0219120 | 4/1987 | European Pat. Off. | 340/870.16 |
| 009479 | 5/1987 | European Pat. Off. | |
| 0130030 | 6/1987 | Japan | 340/870.16 |

OTHER PUBLICATIONS

Rosemount Inc., "Model 3051 Differential Pressure Transmitter", Mar., 1987.

*Primary Examiner*—Ulysses W. Don

*Attorney, Agent, or Firm*—Westman, Champlin & Kelly

[57] ABSTRACT

A transmitter for use in a process control system has externally accessible actuators for permitting external adjustment of the zero and span (or full scale) settings of the transmitter. The transmitter has an explosion-proof housing which includes an interior chamber in which transmitter circuitry is located. Each of the actuators includes a movable magnet which operates a magnetic reed switch located within the interior chamber of the housing through a wall of the housing. Each of the magnets is mounted on a movable actuator which extends into a blind hole in a wall of the housing. By moving the magnet within its hole, the corresponding reed switch can be changed from a non-actuated to an actuated state. When the zero reed switch is actuated, the transmitter circuitry adjusts its output so that the present value of the parameter represents a process zero. When the span (or full scale) reed switch is actuated, the transmitter circuitry adjusts its output so that the present value of the sensed parameter represents a process maximum.

8 Claims, 4 Drawing Sheets

TRANSMITTER WITH MAGNETIC ZERO/SPAN ACTUATOR

This is a continuation of application Ser. No. 07/414,723 filed on Sep. 29, 1989, which in turn is a continuation of application Ser. No. 07/112,410 filed on Oct. 22, 1987, both abandoned as of the date of this application.

BACKGROUND OF THE INVENTION

Cross-Reference to Related Application

Reference is hereby made to the copending application of Roger L. Frick, Ser. No. 899,378 dated Aug. 22, 1987, now issued as U.S. Pat. No. 4,782,659, assigned to the same assignee as this application.

1. Field of the Invention

The present invention relates to transmitters used in industrial process control systems.

2. Description of the Prior Art

Two-wire transmitters (as well as three-wire widespread use in and four-wire transmitters) find industrial process control systems. A two-wire transmitter includes a pair of terminals which are connected in a current loop together with a power source and a load. The two-wire transmitter is powered by the loop current flowing through the current loop, and varies the magnitude of the loop current as a function of a parameter or condition which is sensed. Three and four wire transmitters have separate leads for supply current and outputs. In general, the transmitters comprise energized electrical circuits which are enclosed in a sealed housing such that ignition of any combustible atmosphere by faults or sparks from the energized circuit is contained in the housing.

Although a variety of operating ranges are possible, the most widely used two-wire transmitter output varies from 4 to 20 milliamperes as a function of the sensed parameter. It is typical with a two-wire transmitter to provide adjustment of the transmitter so that a minimum or zero value of the parameter sensed corresponds to the minimum output (for example a loop current of 4 milliamperes) and that the maximum parameter value to be sensed corresponds to the maximum output (for example 20 milliamperes).

The minimum and maximum parameter values will vary from one industrial process installation to another. It is desirable, therefore, to provide some means for setting the maximum and minimum output levels in the field, and this is done typically with electrically energized zero and span potentiometers sealed in the housing. With some transmitters, a housing cover must be removed to gain access to the potentiometers for adjustment, undesirably exposing the atmosphere surrounding the transmitter to the live circuits in the transmitter. A variety of techniques, however, are available for adjusting the potentiometers while sealing potentially explosive atmospheres surrounding the transmitter from the electrically live circuits in the transmitter. In some transmitters, a rotary adjustment shaft for adjusting a potentiometer is closely fitted through a bore in the housing to provide a long flame path for quenching ignition in the housing before it reaches the atmosphere surrounding the housing. In yet another arrangement, the potentiometers are mechanically coupled to a relatively large bar magnet which is then rotated magnetically by another bar magnet outside the live circuit's enclosure. This arrangement with bar magnets can have the disadvantage of mechanical hysteresis, making precise span and zero setting difficult. Actuated switches are also used for setting span and zero in transmitters, such switches requiring an opening through the wall of the transmitter's housing to provide for mechanical coupling to the switch.

For many process control environments, the transmitter itself is required to have an explosion-proof enclosure. This means that, if a spark takes place inside of the transmitter housing which ignites gases within the housing, no hot gases should be propagated from the interior of the transmitter to the exterior which could cause any surrounding combustible atmosphere to ignite.

Providing for zero and span adjustments which are accessible from outside the transmitter (so that the housing would not have to be opened) is desirable, but makes it difficult to maintain the explosion-proof characteristics of the transmitter. External span and zero actuators have, in the past, needed either bulky magnet pairs for transmitting rotational force or passages formed through the transmitter housing wall, so that one end of the actuating mechanism extends into the chamber which contains the transmitter electronics, while the other end is accessible from the exterior of the transmitter. In order to maintain explosion-proof characteristics, very long flame paths must be created with very tight tolerances. It is also important that the passages be sealed so that moisture cannot enter the transmitter housing through the span and zero actuator passages.

There is a continuing need for improved zero and span actuators which are easier to fabricate, require less critical tolerances, and are less expensive than prior art actuators.

SUMMARY OF THE INVENTION

The present invention relates to a process control transmitter which provides for external actuation for calibration purposes such as zero or span setting without requiring a passage through the housing wall to the interior chamber in which the transmitter circuitry is located. In the present invention, the actuator includes a magnetically actuated switch located within the interior chamber of the transmitter adjacent to a wall of the transmitter housing. A magnet is mounted within a blind hole in the wall and is movable between a position in which the switch is not actuated and a position in which the switch is actuated. The blind hole opens to the exterior of the transmitter, so that means for selectively moving the magnet between the non-actuating and actuating positions is accessible from the exterior of the transmitter.

With the present invention, a signal is provided from the exterior of the transmitter without requiring a passage through the housing wall or the presence of a bulky permanent magnet inside the main cavity in the housing. As a result, the need for a long flame path and very tight tolerances is eliminated, because there is no connection between the blind hole and the interior chamber of the transmitter housing.

DETAILED DESCRIPTION OF THE PREFERRED EMBODIMENTS

Figure 1:
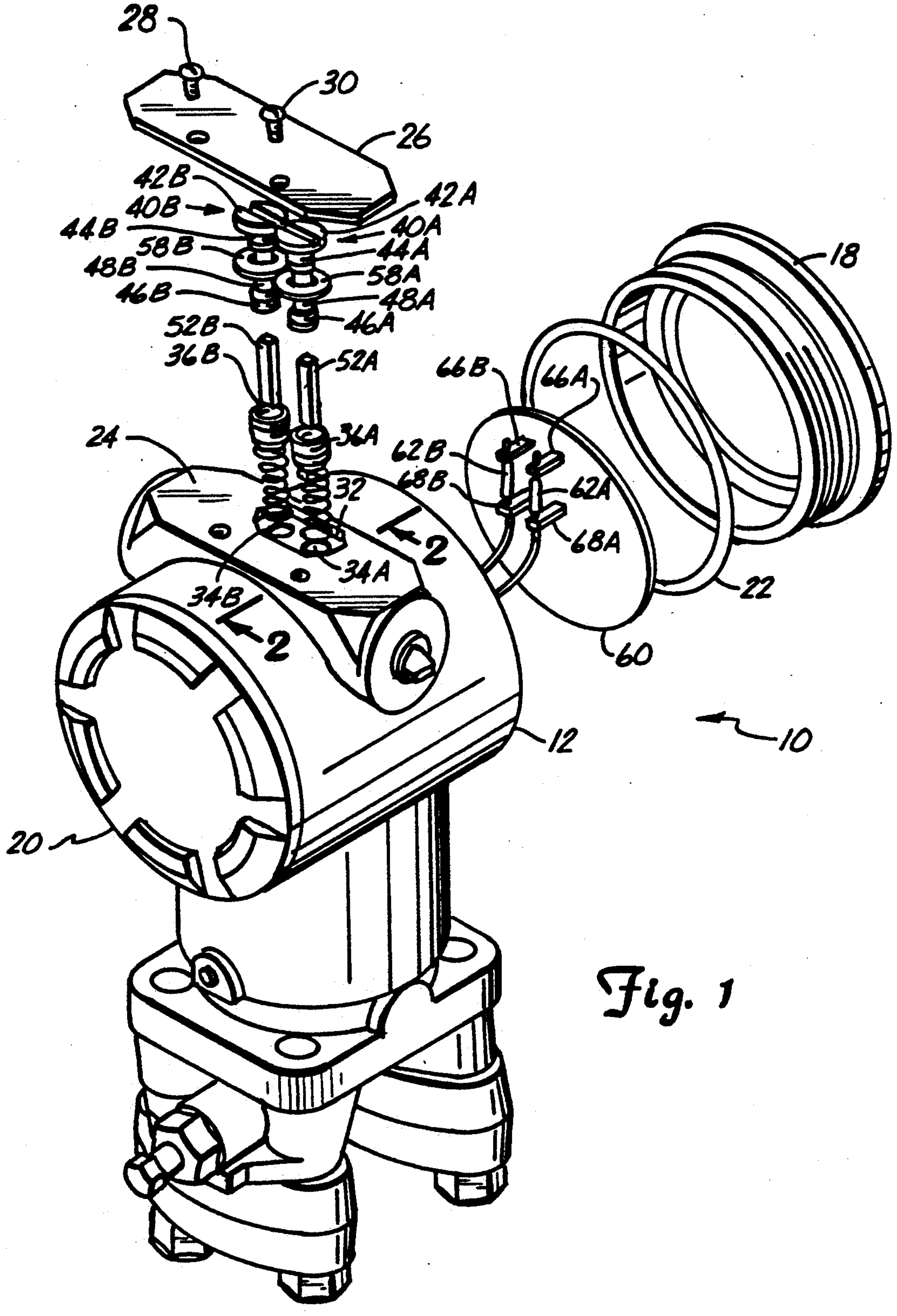
FIG. 1 is a partially exploded perspective view of a transmitter with the magnetic zero/span actuator of the present invention.
Figure 2A:
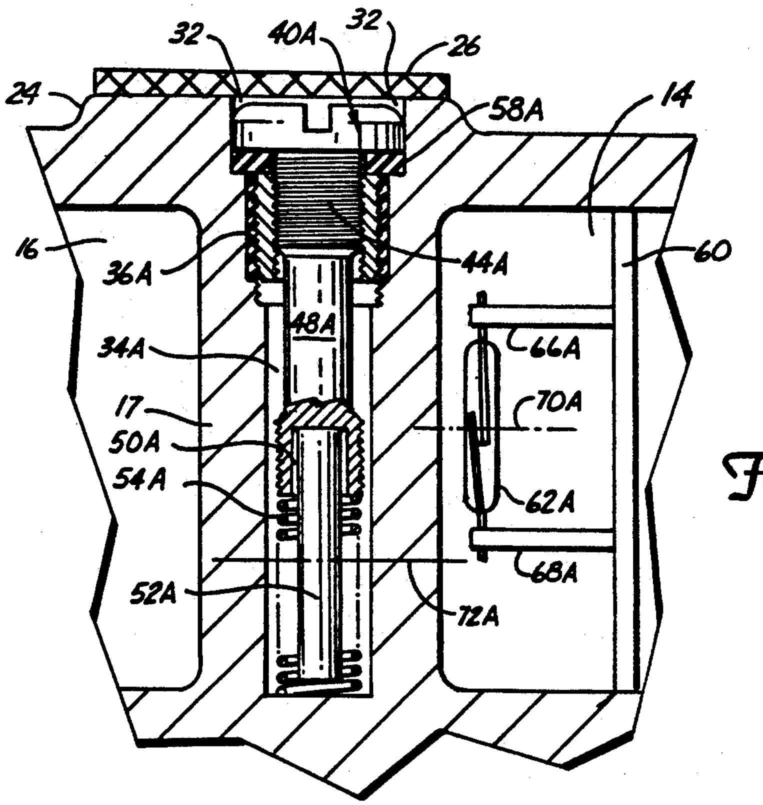
FIGS. 2A and 2B are sectional views, along section 2—2 of FIG. 1, showing a preferred embodiment of the magnetic actuator in its non-actuating and its actuating position, respectively.
Figure 2B:
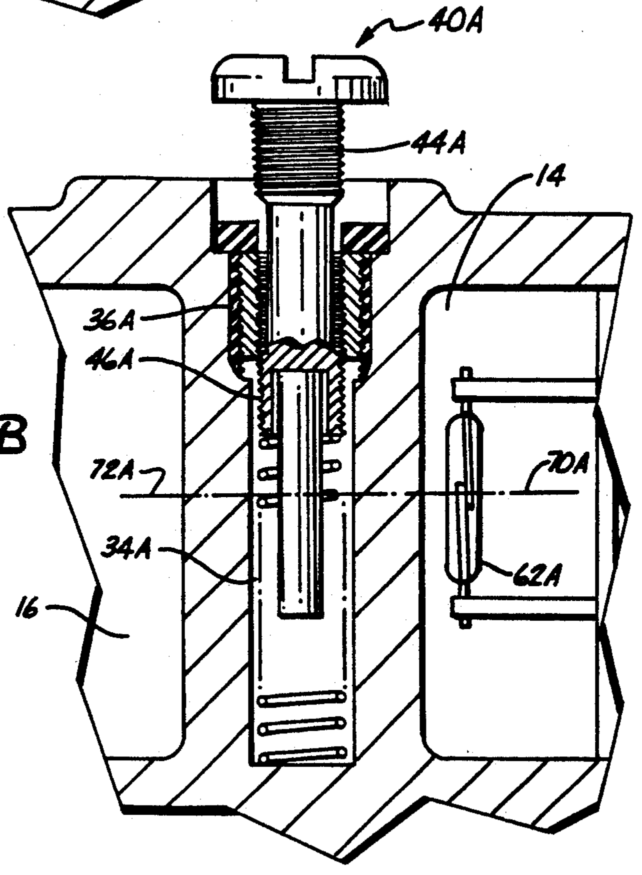

FIG. 1 shows pressure transmitter 10, which includes the magnetic zero and span actuator of the present invention. Transmitter 10 has a main housing 12 which defines a pair of internal chambers 14 and 16 separated by center wall 17 (as shown in FIGS. 2A and 2B). The transmitter's energized electronics and terminals are housed in chambers 14 and 16 respectively. End caps 18 and 20 close chambers 14 and 16 to seal chambers 14 and 16 from the external environment and provide explosion-proof characteristics to the housing. End caps 18 and 20 are threaded and screwed into mating threads on housing 12 so that the threads provide a long, narrow path for quenching flames. As shown in FIG. 1, O-ring 22 associated with end cap 18 provides a fluid-tight seal with transmitter housing 12, and a similar O-ring (not shown) provides a seal between end cap 20 and housing 12.

Transmitter housing 12 has a relatively flat surface 24 which is located near its top. Identification plate 26 (which typically includes a identification of the manufacturer, the model number and the serial number of the transmitter) is removably attached to surface 24 by a pair of screws 28 and 30.

A recess 32 is formed in surface 24. A pair of blind holes 34A and 34B extend downward from recess 32 into center wall 17 of housing 12. Internally threaded inserts 36A and 36B are press-fitted into the upper ends of holes 34A and 34B, respectively. There is no flame path between the blind holes 34A and 34B and the chambers 14 and 16.

Screws 40A, 40B extend down into blind holes 34A, 34B through threaded inserts 36A, 36B, respectively. Screws 40A, 40B have screw heads 42A, 42B at their upper ends; upper threaded portions 44A, 44B; lower threaded portions 46A, 46B; intermediate unthreaded portions 48A, 48B of smaller diameter than the threaded portions; and recesses 50A, 50B in their lower ends. Permanent magnets 52A, 52B have their upper ends inserted with a press-fit in recesses 50A, 50B so that permanent magnet 52A moves in an axial direction with screw 40A, and permanent magnet 52B moves in an axial direction with screw 40B. Return springs 54A, 54B are mounted coaxially on the lower end of permanent magnets 52A, 52B, with their lower ends engaging the bottoms of blind holes 34A, 34B and their upper ends engaging the lower ends of screws 40A, 40B, respectively.

Rubber washers 58A, 58B are positioned below heads 42A, 42B, respectively. They provide an environmental seal for holes 34A and 34B.

Positioned within interior chamber 14 is circuit board 60, which carries some of the energized transmitter circuitry. The energized transmitter terminals 100, 102 and a portion of the loop circuit 101 are located in the chamber 16.

Magnetically actuated reed switches 62A and 62B are electrically connected to the circuitry on circuit board 60 and are thus energized. Support posts 66A and 68A support reed switch 62A so that it is parallel to blind hole 34A and is positioned adjacent center wall 17. Similarly, support posts 66B and 68B extend from circuit board 60 and support reed switch 62B parallel to blind hole 34B.

Reed switches 62A and 62B are actuated by magnets 52A and 52B, respectively. Reed switches 62A and 62B are normally open, and do not close until the centerline of their respective magnets 52A, 52B approaches the centerline of the switches. For reference, in FIGS. 2A and 2B, centerline 70A of reed switch 62A and centerline 72A of magnet 52A are shown.

FIGS. 2A and 2B show magnet 52A and reed switch 62A. The operation of magnet 52B and reed switch 62B is essentially identical, and will not be discussed separately.

Each of the reed switches 62A and 62B comprises a pair of narrow strips formed of a material which is electrically conductive and magnetically soft, such as permalloy. The strips are sealed into opposite ends of a glass tube and overlap one another near the centerline 70A of the reed switch. When the centerline of the magnet 72A and the centerline of the reed switch 70A are substantially aligned, the two narrow strips are magnetically attracted toward one another and bend to contact each other, closing an electrical circuit between them. When the upper pole or end of the magnet 72 is near the centerline 70A of the reed switch 70A, the overlapping ends of the narrow strips are held apart, and the circuit between the strips is open. The arcing or sparking contact of each reed switch is thus sealed from the atmosphere in the chamber 14. Both the glass tube and the wall 17 thus separate the contacts from the atmosphere surrounding the transmitter 10. Wall 17 is formed of a substantially non-magnetic material so that the magnetic flux from magnets 52A, 52B can couple effectively to the reed switches 62A, 62B. When the two switch assemblies are close together, it is desired that the north poles of the two magnets be oriented in the same direction to prevent undesired interaction.

As shown in FIG. 2A, identification plate 26 is mounted on surface 24 and covers recess 32. In this condition, which is the normal operating condition for transmitter 10, upper threads 44A of screw 40A are fully threaded into threaded insert 36A, and magnet 52A is in its lowermost position within blind hole 34A. Spring 54A is compressed, but the bias force being applied is counteracted by the threaded connection between upper threads 44A of screw 40A and the internal threads of insert 36A. In the position shown in FIG. 2A, the centerline 72A of magnet 52A is well below centerline 70A of reed switch 62A, and reed switch 62A remains in its normally open state.

In order to move magnet 52A up and actuate reed switch 62A, identification plate 26 is removed by removing screws 28 and 30. This exposes the upper ends of screws 40A and 40B. Using a screw driver (not shown), a technician backs screw 40A out until upper threads 44A clear the internal threads of insert 36A. At this point, spring 54A, which has been compressed, pushes actuation screw 40A up until lower threads 46A contact threaded insert 36A. At this point, movement is stopped and the magnet centerline 72A is essentially aligned with reed switch centerline 70A. This causes reed switch 62A to close.

As will be described in further detail later, the transmitter circuitry then waits a predetermined amount of time before responding to the change-of-state of reed switch 62A or 62B. In response to a change--of-state, the circuitry adjusts itself to indicate either a zero reading (such as 4 milliampere output) or a full scale reading (such as 20 milliamperes) depending on which of the two actuator screws 40A or 40B was used. Thereafter, whenever the value of the sensed paragraph is the same, the zero reading (or full scale reading) will be provided by transmitter 10 as its output.

Figure 3:
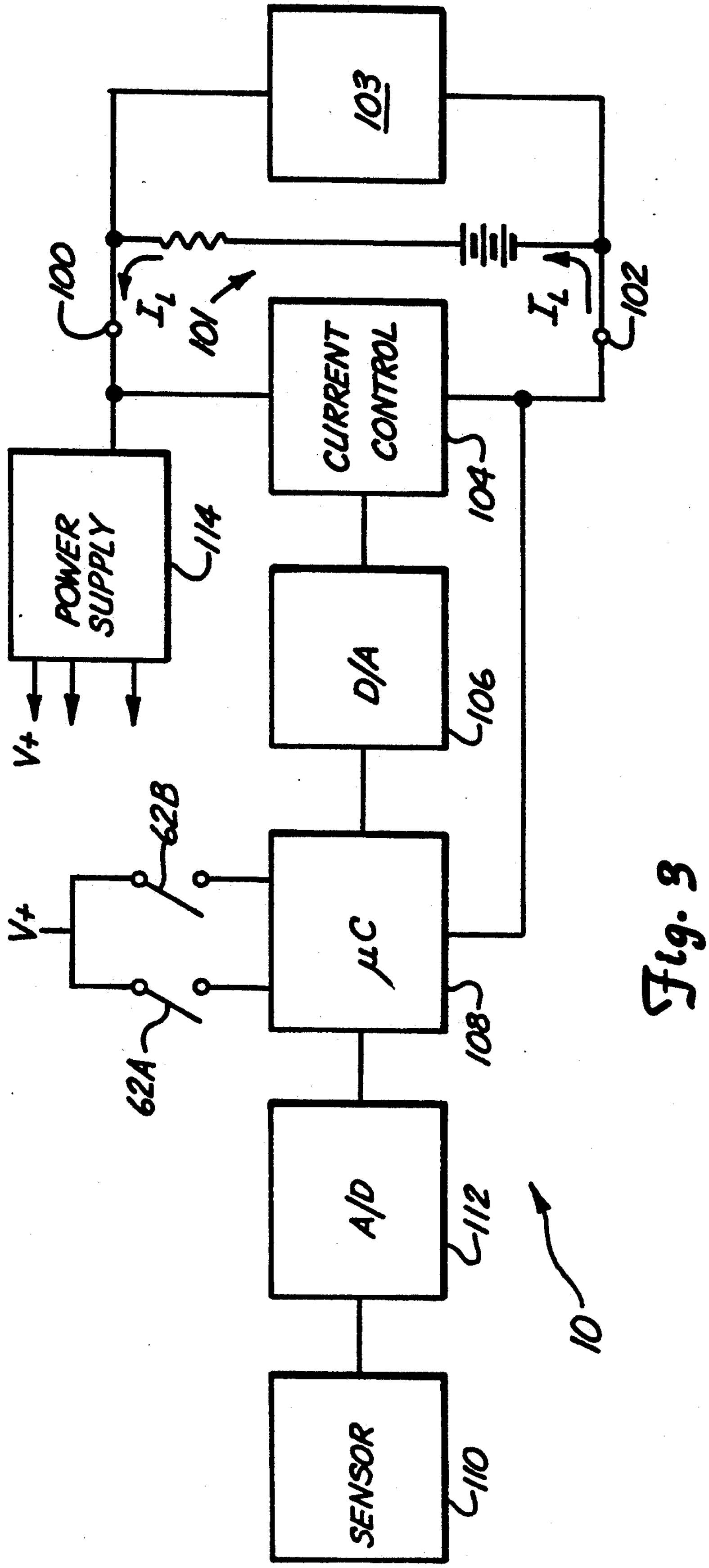
FIG. 3 is an electrical block diagram of a preferred embodiment of the transmitter circuitry used in conjunction with the magnetic zero/span actuator of the present invention.

FIG. 3 shows an electrical block diagram of two-wire transmitter 10. Transmitter 10 of FIG. 3 includes a pair of electrical terminals 100 and 102 which are connected to a two-wire current loop 101. The loop current $I_L$ flows in through terminal 100 and out through terminal 102. The magnitude of loop current $I_L$ is controlled to be representative of the sensed parameter by current control 104 based upon a control signal received from digital-to-analog (D/A) converter 106. The control signal provided by D/A converter 106 is based upon a digital value representative of the sensed parameter and adjusted for span and zero settings supplied by microcomputer system 108. Sensor 110 senses the parameter (e.g., pressure or temperature) and provides an analog signal representative of the sensed parameter to analog-to-digital (A/D) converter 112. The digital output of A/D converter 112 is provided as an input to microcomputer system 108.

Reed switches 62A and 62B are connected to input ports of microcomputer system 108. Switches 62A and 62B are connected to supply potential V+, so that when they are closed they provide high logic levels to their respective input ports. Biasing resistors are coupled between the input ports and a DC common level so that when the switches are open, a low logic level is provided to the input ports.

Power supply 114 provides the necessary supply voltages to the other components of the transmitter shown in FIG. 3. In this particular embodiment, all power used by the transmitter circuitry is derived from the loop current $I_L$.

Microcomputer system 108, during each pass through its operating cycle or update loop, performs a routine which determines whether reed switches 62A and 2B are closed. This routine is shown in FIG. 4.

Figure 4:
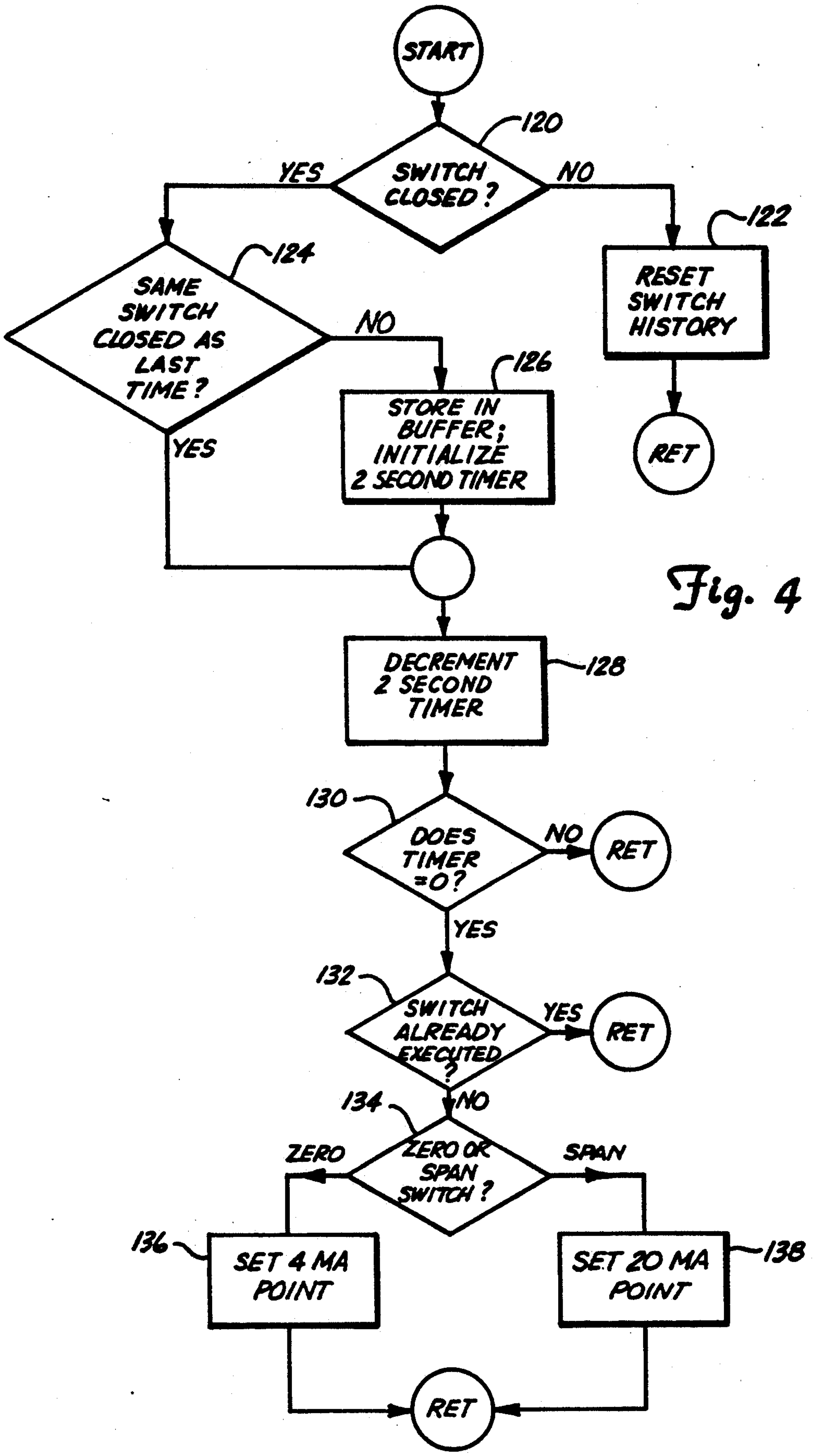
FIG. 4 is a flow chart showing operations of a microcomputer of the transmitter circuitry of FIG. 3 when one of the zero/span actuators is actuated.

Microcomputer system 108 first checks to see whether either of the switches 62A, 62B is closed as shown at 120 in FIG. 4. If the answer is no, a running switch history (described below) is reset as shown at 122 and microcomputer system 108 returns to its normal cycle.

If, on the other hand, a switch is closed, microcomputer system 108 then checks to see whether this is the same switch which was closed the last time the routine was performed as shown at 124. If the answer is no, the identity of the switch which was closed is put in a buffer and a two-second timer is initialized as shown at 126 and then decremented by one as shown at 128. On the other hand, if the same switch was closed the last time the routine was performed, the two-second timer is simply decremented as shown at 128.

Once the two-second timer has been decremented, microcomputer system 108 checks to see whether the two-second timer has reached zero as shown at 130. If the answer is no, microcomputer system 108 returns to its normal operating cycle. If the answer is yes, microcomputer system 108 then checks to see whether it has already executed a span or zero function based on this particular switch having timed out as shown at 132. If the answer is yes, it means that the actuator screw 40A or 40B has not been screwed back in yet, but microcomputer system 108 does not need to perform the zero or span calibration function another time.

If the two-second timer has timed out for the first time, microcomputer system 108 then checks to see whether it is the zero or the span switch which is closed as shown at 134. If it is the zero switch that is closed, then microcomputer system 108 takes the then current sensor reading which it received from A/D converter 112 and uses that value thereafter as the "zero" point and sets that zero point to correspond to a 4 milliampere value of loop current $I_L$ at the then sensed parameter value as shown at 136. Microcomputer system 108 outputs the digital value to D/A converter 108 which will cause current control 104 to produce a 4 milliampere output.

If the span switch has been actuated, microcomputer system 108 takes the then-current sensor reading and correlates that to the 20 milliampere output level for loop current $I_L$. Microcomputer system 108 provides the appropriate digital value to D/A converter 106 which will provide the necessary control signal to current control 104 to cause $I_L$ to equal 20 milliamperes as shown at 138. The digital value from A/D converter 112 which corresponds to that 20 milliampere output is stored by microcomputer system 108 and used subsequently. The span of the transmitter is adjusted accordingly so that there is a linear relationship between the sensed variable and the output current.

In this particular embodiment, the "zero" setting is an offset adjustment in that it effects all points equally. It indicates to microcomputer system 108 that a particular sensor reading is the process zero and should result in a 4 milliampere loop current.

The span switch in this particular embodiment actually sets the process maximum or full scale value. Microcomputer system 108 is adjusted by the technician, by actuating the span reed switch, so that the current sensor reading corresponds to a process maximum value and therefore should correlate to a 20 milliampere output.

In a preferred embodiment of the present invention, the update loop or cycle for microcomputer system 108 is on the order of forty milliseconds long. To produce a two-second time-out, the routine shown in FIG. 4 must be performed approximately fifty times. If either switch 62A or 62B opens for 40 milliseconds sometime during the two-second interval and then re-closes, the switch history is reset and the two-second timer has to be reinitialized. This provides some protection against brief actuations of switch 62A or 62B due to vibration, or accidental re-actuation of switch 62A or 62B while the actuator screw 40A or 40B is being threaded back into its normal "down" position.

The particular embodiment shown in FIGS. 3 and 4 is, of course, only one example of a transmitter circuit which can make use of the magnetic zero/span actuator of the present invention. For a more detailed description of such a two-wire transmitter circuit, reference is made to U.S. Pat. No. 4,783,659 by Roger L. Frick entitled ANALOG TRANSDUCER CIRCUIT WITH DIGITAL CONTROL, which is assigned to the same assignee as the present application and incorporated herein by reference.

The transmitter 10 of FIG. 1 can also be fabricated with a single actuator rather than two actuators for setting span and zero. This can be implemented in several different ways depending on the control algorithm entered in microcomputer system 108.

In one algorithm, no adjustment for span or zero is made until the actuator is up for at least 2 seconds. If the actuator is pushed back down between 2 and 4 seconds after the actuator is let up, then the zero setting is adjusted to the current value of the process variable when the actuator is pushed back down. If the actuator is pushed back down more than 4 seconds after the actuator is let up, then the full scale setting is adjusted to the current value of the process variable when the actuator is pushed back down.

In a second algorithm, if the actuator is let up and pushed down only once during a two second time period, then the zero setting is adjusted to the current value of the process variable at the end of the two second interval. If the actuator is let up and pushed down three or more times during a two second interval, then the full scale setting is adjusted to the current value of the process variable at the end of the two second interval.

In yet another arrangement, the zero setting is adjusted to the current value of the process variable 50 milliseconds after the actuator is let up, and the full scale setting is adjusted to the current value of the process variable 50 milliseconds after the actuator is again pushed down.

The magnetic zero/span actuator of the present invention has a number of important advantages. First, it allows hysteresis-free setting of zero and span through external actuators, without compromise of the explosion-proof characteristics of the housing.

The present invention provides external actuation for setting zero and span without creating a flame path from the interior of the transmitter to the exterior. As a result, the need for elaborate seals and very tight tolerances, as well as long passages to produce long flame paths, is avoided.

Another advantage of the present invention is that the actuator screws 40A and 40B and magnets 52A and 52B can be removed entirely without affecting the operation of transmitter 10, and without leaving an open passage to the interior of transmitter 10. This makes adjustment of transmitter 10 span and zero setting resistant to tampering. A software flag can also be set from a remote digital communicator 103 which will disable the span and zero setting functions of switches 62A, 62B located at the transmitter providing redundant protection against tampering with span and zero settings.

In addition, it is possible to provide a transmitter which allows settings of only zero or only span simply by removing one of the actuator screws 40A, 40B and its corresponding magnet 52A, 52B.

Although the present invention has been described with reference to preferred embodiments, workers skilled in the art will recognize that changes may be made in form and detail without departing from the spirit and scope of the invention.

What is claimed is:

1. A two wire transmitter for connection to a two wire communication loop, comprising:

a main enclosure;

a sensor for sensing a parameter and providing a sensor output;

a center wall in the main enclosure which divides the main enclosure into a first enclosure and a second enclosure and provides an airtight seal between the first enclosure and the second enclosure;

a first end cap adapted for providing an airtight seal for the first enclosure;

a second end cap adapted for providing an airtight seal for the second enclosure;

two wire transmitter circuitry carried in the first enclosure for receiving power over the two wire communication loop and controlling an electrical current level in the loop between an minimum level and a maximum level as a function of the sensor output;

a magnetically operated span adjustment switch carried in the first enclosure adjacent the center wall;

a magnetically operated zero adjustment switch carried in the first enclosure adjacent the center wall;

a span adjustment blind hole which opens to the outside of the main enclosure and which extends into the center wall adjacent the magnetically operated span adjustment switch;

a zero adjustment blind hole which opens to the outside of the main enclosure and which extends into the center wall adjacent the magnetically operated span zero adjustment switch;

a span adjustment magnet slidably received in the span adjustment blind hole and slidable between an outermost position in which the magnetically actuated span adjustment switch is actuated and an innermost position in which the magnetically actuated span adjustment switch is not actuated;

a zero adjustment magnet slidably received in the zero adjustment blind hole and slidable between an outermost position in which the magnetically actuated zero adjustment switch is actuated and an innermost position in which the magnetically actuated zero adjustment switch is not actuated;

first spring means for urging the span adjustment magnet toward the outermost position;

second spring means for urging the zero adjustment means toward the outermost position;

a span adjustment screw threadably received in the span adjustment blind hole and having an inner end which carries the span adjustment magnet, the span adjustment screw having a normal operating position in which it holds the span adjustment magnet in the innermost position against a force of the first spring means, and having a span adjust position which defines the outermost position of the span adjustment magnet, the span adjustment screw being capable of being released from the normal operating position to allow the first spring means to move the span adjustment magnet from the innermost position to the outermost position;

a zero adjustment screw threadably received in the zero adjustment blind hole and having an inner end which carries the zero adjustment magnet, the zero adjustment screw having a normal operating position in which it holds the zero adjustment magnet in the innermost position against a force of the second spring means, and having a zero adjust position which defines the outermost position of the zero adjustment magnet, the zero adjustment screw being capable of being released from the normal operating position to allow the second spring means to move the zero adjustment magnet from the innermost position to the outermost position;

means coupled to the span adjustment switch for providing a span adjustment by causing the transmitter circuitry to associate a first sensor output value present when the span adjustment switch has been actuated for longer than a predetermined time period with the maximum level, so that after the span adjustment switch is returned to a not actuated state, an occurrence of a sensor output which equals the first sensor output value will cause the transmitter circuitry to control the current level in the loop to the maximum level; and means coupled to the zero adjustment switch for providing a zero adjustment by causing the transmitter circuitry to associate a second sensor output value present when the zero adjustment switch has been actuated for longer than the predetermined time period with the minimum level, so that after the zero adjustment switch is returned to a not actuated state, an occurrence of a sensor output which equals the second sensor output valve will cause the transmitter circuitry to control the current level in the loop to the minimum level.

2. The two wire transmitter of claim 1 wherein:

the span adjustment screw has an outer end and includes means for carrying the span adjustment magnet at its inner end; and the zero adjustment screw has an outer end and includes means for carrying the zero adjustment magnet at its inner end.

3. The two wire transmitter of claim 2 wherein:

the first spring means is positioned between a bottom of the span adjustment blind hole and the span adjustment screw for applying bias force to the span adjustment screw in an outward direction; and the second spring means is positioned between a bottom of the zero adjustment blind hole and the zero adjustment screw for applying bias force to the zero adjustment screw in an outward direction.

4. The two wire transmitter of claim 17 and further comprising:

means for limiting movement of the span adjustment screw in the outward direction; and means for limiting movement of the zero adjustment screw in the outward direction.

5. The two wire transmitter of claim 4 wherein:

the span adjustment screw has first and second threaded portions separated by an intermediate portion of smaller diameter; and the zero adjustment screw has first and second threaded portions separated by an intermediate portion of smaller diameter.

6. The two wire transmitter of claim 5 wherein:

the means for limiting movement of the span adjustment screw comprises a span adjustment threaded insert in the span adjustment blind hole, the insert engaging the second threaded portion of the span adjustment screw to limit movement in an outward direction; and the means for limiting movement of the zero adjustment screw comprises a zero adjustment threaded insert in the zero adjustment blind hole, the insert engaging the second threaded portion of the zero adjustment screw to limit movement in an outward direction.

7. The two wire transmitter of claim 6 wherein the span adjustment insert has internal threads for engaging the first threaded portion of the span adjustment screw and the zero adjustment insert has internal threads for engaging the first threaded portion of the zero adjustment screw.

8. A process control transmitter, comprising:

a sensor for sensing a parameter;

transmitter circuitry for producing a transmitter output as a function of a sensor signal from the sensor;

a sealed main enclosure for containing the sensor and the transmitter circuitry;

a blind hole which extends into a wall of the main enclosure and which opens to the outside of the main enclosure;

a magnetically-actuated switch carried in the main enclosure adjacent the wall and the blind hole, and having a first state and a second state;

an adjustment magnet positioned in the blind hole and movable between a stable outermost position in the hole in which the magnet causes the magnetically-actuated switch to be in the first state and a stable, normally occupied innermost position in the hole in which the magnet causes the magnetically-actuated switch to be in the second state;

a manually operable adjustment screw positioned in the blind hole for selectively moving the adjustment magnet between the stable, normally occupied innermost position and the stable outermost position when an adjustment in operation of the transmitter is desired, the adjustment screw including:

an outer end which is exposed for access from outside the blind hole;

an inner end which is located within the blind hole and carries the adjustment magnet;

a first threaded portion located adjacent the outer end;

a second threaded portion located adjacent the inner end; and an intermediate portion between the first and second threaded portions and having a diameter which is smaller than diameters of the first and second threaded portions;

a bias spring located within the blind hole for applying force to the adjustment screw in an outward direction;

means for releasably engaging the first threaded portion of the adjustment screw to hold the magnet in the innermost position;

means for engaging the second threaded portion to halt outward movement of the adjustment screw at the outermost position; and means for causing the transmitter circuitry to associate a then current value of the sensor signal with a predetermined value of the transmitter output when the magnetically-actuated switch remains in the first state for a predetermined time period.

* * * * *

UNITED STATES PATENT AND TRADEMARK OFFICE

CERTIFICATE OF CORRECTION

PATENT NO. : 5,278,543

DATED : January 11, 1994

INVENTOR(S) : Kelly M. Orth et al.

It is certified that error appears in the above-indentified patent and that said Letters Patent is hereby corrected as shown below:

On the title page item [56],

Delete "009479 5/1987 European Pat. Off." and insert --009749 5/1987 European Pat. Off.--.

Col. 1, cancel line 21 and insert --and four-wire transmitters) find widespread use in--.

Col. 8, line 10, delete "an" and insert --a--.

Col. 9, line 20, delete "valve" and insert --value--.

Col. 9, line 40, delete "17" and insert --3--.

Signed and Sealed this

Twenty-seventh Day of June, 1995

Attest:

BRUCE LEHMAN

*Attesting Officer* *Commissioner of Patents and Trademarks*